June 23, 1936.  T. C. POND  2,045,099
CELLULAR MATERIAL AND METHOD OF MAKING SAME
Filed July 23, 1932
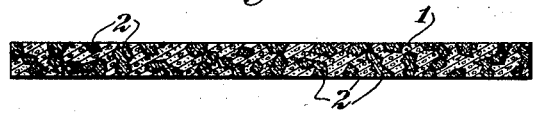
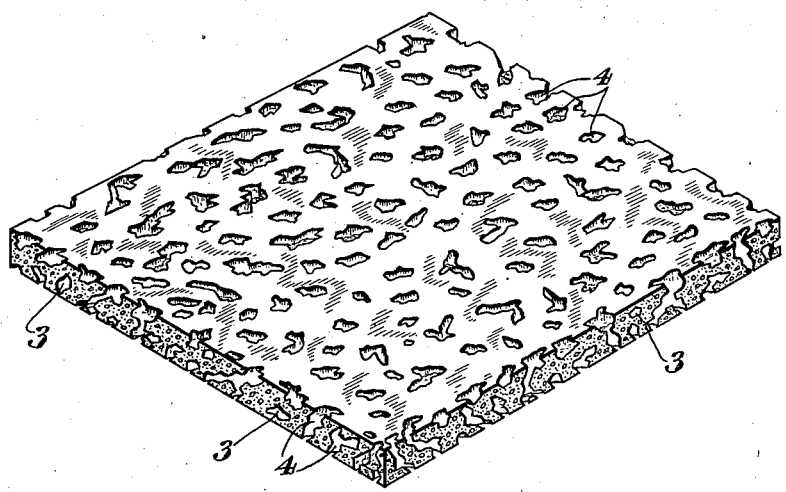
INVENTOR
Thomas C. Pond.
BY
ATTORNEY Patented June 23, 1936

2,045,099

UNITED STATES PATENT OFFICE 2,045,099

CELLULAR MATERIAL AND METHOD OF MAKING SAME

Thomas C. Pond, Larchmont, N. Y., assignor to Johns-Manville Corporation, New York, N. Y., a corporation of New York Application July 23, 1932, Serial No. 624,294

2 Claims. (Cl. 25—155)

This invention relates to a cellular material and method of making the same, and particularly to a compressed and densified and then hardened sheet containing a cementitious material and reenforcing fibers and provided with cells and/or with openings extending through the sheet.

A preferred embodiment of the invention comprises a preformed, cellular, structural unit and a method of making it that includes compounding a mixture of a hydraulic cementitious material, reenforcing fibers, water, and a readily removable filler, shaping and strongly compressing the mixture, hardening the shaped and compressed product, and removing the filler.

A commonly used acoustical structure is one in which a sound-absorbing material is disposed behind an independent facing member provided with perforations adapted to admit incident sound. Thus, there is used a pad of rock wool or asbestos fibers provided with an evenly perforated metal facing or a hardened and regularly perforated sheet consisting of asbestos fibers and Portland cement.

It is a purpose of the present invention to provide a convenient method of making a sheet of asbestos and cement or the like, with cells or pores embedded within the sheet and/or with openings of uneven spacing and irregular shape that extend through the sheet and that may resemble in appearance imperfections in a natural product. Other objects and advantages of the invention will appear as the description thereof progresses.

A preferred embodiment of the invention is illustrated in the drawing in which,

Fig. 1 shows a cross sectional view of a compressed and densified structural unit containing a readily removable filler material.

Fig. 2 shows a perspective view of a structural unit in which the filler illustrated in Fig. 1 has been removed, to leave cells or openings of shape and size corresponding approximately to the particles of filler originally present.

In the figures, like reference characters denote like parts.

Thus, I denotes a compressed and densified mixture of cementitious material and reenforcing fibers. The cementitious material is suitably hydraulic. While Portland cement is the material preferred at this time, there may be used, if desired, another cementitious material. Thus, there may be used calcium aluminate cement, sometimes known as cement fondu or Lumnite cement. The fibers that are preferred as the reenforcing material are short fibers of chrysotile asbestos or the like. Such fibers are readily wetted by a liquid of the type of water. The fibers are preferably fire- and heat-proof and are suitably of inorganic composition.

Fig. 1 shows granules or particles 2 of filler material adapted to be removed readily, that is, without destruction of the containing unit of hydraulic cementitious and fibrous material, in distinction from the result obtained with fillers, such as sawdust, which are removable only under conditions which greatly weaken such a structure. The filler may be liquefiable and removable by liquefaction, as by fusion or by solution in a solvent, either after or simultaneously with the hardening of the cement in the mixture. Fillers that may be used include paraffin, in the form of small particles or balls, and cracked ice, both of which are removable by fusing (melting). A fusible water-insoluble filler of the type of paraffin has the advantage of non-miscibility with the surrounding aqueous cementitious composition. Unlike cracked ice, such a filler, even though it melts before the cementitious material is hardened, does not lose its identity or property of producing voids upon subsequent removal, these voids corresponding individually to spaces occupied originally by the filler. The reenforcing fibres extend throughout the finished article, at positions between the said voids. Other fillers that may be used include those that may be incorporated into the composition as granules or particles of proper size and later dissolved out by means of a solvent. Thus, there may be used a water-soluble compound, such as a salt that is not seriously or permanently injurious to the cement and fiber composition. Such a salt may be removed from a unit by leaching with water. Among the salts that meet these requirements are common salt (sodium chloride) and sodium nitrate. The filler should be compression-resistant.

After the liquefiable filler material is removed, the space previously occupied by it will appear as cells or voids 3, or openings 4, in the product.

In making a product of the class described, the following method may be used. There is compounded a mixture in the form of a wet slurry including Portland cement, short asbestos fibers, granular rock salt filler, and water. The proportion of Portland cement to asbestos fibers may be one that is commonly used in making imperforate sheets of these two materials of the kind now in wide commercial use. Thus, there may be used Portland cement and asbestos in the proportion of 20 to 55 parts by weight of asbestos fibers to 100 parts of total weight of asbestos and cement. The proportion of liquefiable filler used may be varied to make finished products of differing degrees of porosity and strength. For example, there may be used 50 to 100 parts by weight of salt to 100 parts of asbestos and cement. Water is used in amount sufficient to make the mixture into a slurry.

Before the water dissolves the salt largely, the slurry is quickly shaped into a sheet and strongly compressed in a mold having a filtering face.

For this purpose there may be used a hydraulic press assembly provided with a bed in the form of a mold with a strongly supported, filtering bottom. Into this bed is placed a layer of the slurry sufficient to give a sheet of the desired thickness after compression. Then pressure is applied to the layer by means of a rigid steel plate which fits into the top of the mold and is actuated by the plunger of the hydraulic press. As the pressure is applied, excess water is squeezed from the slurry and forced through the filtering bottom of the mold. The pressure is built up, finally, to a degree that is sufficient to compress and densify the partially dehydrated mass into a compact sheet, of thickness that may be about one-third of the thickness of the layer in the mold before compression. The pressure used in thus forming a compressed and densified sheet may reach approximately 1,800 pounds or more per square inch.

After the compression and densification is completed, the press is opened and the sheet removed from the mold, in any suitable manner, as by lifting the steel press plate with the sheet adhered thereto, breaking the suction, and thus releasing the sheet over a suitable support. The cement in the sheet is then allowed to take its initial set, say from 1 or 2 days, after which it is allowed to harden.

After the hardening is completed or, preferably, simultaneously with the hardening, the filler material is removed. Thus, the sheet containing granules of rock salt may be leached with water, applied in several portions or continuously, so that substantially all of the salt is removed and the Portland cement is allowed to harden finally in salt-free condition. In general, when the filler used is of the nature of a material adapted to be dissolved out by a solvent, the sheet, after being set, may be treated with the solvent to dissolve out the filler material. An organic filler that is insoluble in water, for example, may be dissolved from a hardened and dried sheet by subjecting the sheet to long-continued soaking in several portions of a solvent for the organic filler.

If the filler material used is one that is readily removable by warming, as is the case when paraffin is used as the filler, by substitution for salt in the procedure described above, the sheet, after setting, may be maintained at a temperature above the melting point of the paraffin until paraffin ceases to flow or drip from the sheet at a substantial rate.

When it is desired that the finished sheet should contain numerous openings and be adapted for use as a facing member for a sound-absorbing element, the filler material used may contain granules of such size as to extend individually from face to face of the compressed sheet. When such granules are used initially in making the composition and are subsequently removed, there are produced voids corresponding individually to the spaces originally occupied by the said granules. Such voids may extend individually from face to face of the unit, as shown in Fig. 2. On the other hand, there may be used smaller granules, either alone or in the presence of such large granules, so that the removal of the granules from the sheet produces a multiplicity of embedded cells or pores that do not extend to the faces of the sheet. Such cells or pores may communicate with each other or may be isolated.

The presence of pores gives lightness in weight to the unit and increases the thermal insulating effect. On the other hand, the compression of the composition and the removal of excess water, before the cement sets and hardens, increase the strength of the product. The result of these factors is a light-weight but reasonably strong material adapted for use as preformed, structural units.

The structural material may be made in the form of sheets of various thicknesses, as, for example $\tfrac{1}{16}$ to 1 inch thick. The openings and cells may have various sizes. Thus, they may have a longest dimension equal to or exceeding the thickness of the sheet and may be so spaced that the perforations that extend to both faces of the sheet correspond to 10 percent or more, say 20 to 40 percent, of the area of surface of the sheet.

These cells and/or the openings in the sheet will be unevenly spaced and irregularly shaped and may correspond in shapes and sizes approximately to the shapes and sizes of the granules of filler material present in the mixture as shaped and compressed and subsequently removed.

The finished product may be provided with beveled edges 5 or may be polished or decorated in a usual manner. Thus, sanding may be conducted until some of the cells originally embedded in the sheet are exposed and caused to form openings in the surface of the sheet.

Since the molding equipment may include a hydraulic press and other apparatus of design that is conventional, it is considered unnecessary to illustrate the equipment used in making the product of the present invention.

The details that have been given are for the purpose of illustration and not restriction, and many variations therefrom may be made without departing from the scope of the invention.

The term "compression-resistant" is used to signify resistant to distortion under pressure, as distinguished from the property of spongy particles that are readily deformed by pressure and that expand more or less to their original shape and size after the pressure is released.

What I claim is:

1. In making a preformed apertured structural unit, the method which comprises compounding a mixture of Portland cement, asbestos fibers, granules of removable filler, and water, shaping the mixture into a sheet, and then hardening the sheet and removing the filler therefrom, the said filler compounded into the mixture containing granules of large size extending individually through the sheet from face to face, whereby removal of the filler produces voids corresponding to the space occupied originally by the granules and extending individually through the unit from face to face.

2. A preformed structural unit comprising a shaped, compressed and densified, and then hardened mixture of a hydraulic cementitious material and reenforcing fibers of the type of asbestos, the said unit being provided with voids extending individually from face to face of the unit and corresponding to the spaces occupied originally by individual granules of filler material initially incorporated and subsequently removed and the said unit being substantially identical with the product made as described in the preceding claim.

THOMAS C. POND.